United States Patent
Sakamoto

(10) Patent No.: US 11,386,251 B2
(45) Date of Patent: Jul. 12, 2022

(54) LOGIC SIMULATION VERIFICATION SYSTEM, LOGIC SIMULATION VERIFICATION METHOD, AND PROGRAM

(71) Applicant: KIOXIA CORPORATION, Tokyo (JP)

(72) Inventor: Toshiyuki Sakamoto, Kamakura Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/190,097

(22) Filed: Mar. 2, 2021

(65) Prior Publication Data

US 2022/0083719 A1 Mar. 17, 2022

(30) Foreign Application Priority Data

Sep. 16, 2020 (JP) .............................. JP2020-155694

(51) Int. Cl.
*G06F 30/3312* (2020.01)
*G06F 119/12* (2020.01)

(52) U.S. Cl.
CPC ...... *G06F 30/3312* (2020.01); *G06F 2119/12* (2020.01)

(58) Field of Classification Search
USPC ........................................................ 716/108
See application file for complete search history.

(56) References Cited

U.S. PATENT DOCUMENTS

| | | | |
|---|---|---|---|
| 6,083,269 A * | 7/2000 | Graef | G06F 30/327 716/136 |
| 6,536,019 B1 | 3/2003 | Ouyang | |
| 6,560,757 B1 * | 5/2003 | Ballam | G06F 30/367 703/2 |
| 6,959,271 B1 * | 10/2005 | Ballam | G06F 30/33 716/136 |
| 7,334,203 B2 | 2/2008 | Chan | |
| 10,755,014 B2 * | 8/2020 | Chou | G06F 30/367 |
| 10,803,219 B1 * | 10/2020 | Ziv | G06F 9/542 |
| 2014/0089872 A1 * | 3/2014 | Galpin | G06F 30/33 716/102 |

FOREIGN PATENT DOCUMENTS

| | | |
|---|---|---|
| JP | 2908339 B2 | 6/1999 |
| JP | 2006-011961 A | 1/2006 |
| JP | 2010-009424 A | 1/2010 |

* cited by examiner

*Primary Examiner* — Mohammed Alam

(74) *Attorney, Agent, or Firm* — Kim & Stewart LLP

(57) ABSTRACT

A logic simulation verification system designates a change timing designation unit configured to designate a reference signal and a change timing and calculate a first time for which there is a possibility that a first signal to be assigned to a variable described in a library, a circuit description, and a test bench is changed in accordance with the reference signal. The system calculates a second time for which there is a possibility that a second signal assigned a variable described in the library, the circuit description, and the test bench will be checked in accordance the reference signal and then determines whether different circuits for which first signals are the same have first times that match. The system also determines whether a first time and a second time match with each other when a first signal of one circuit and a second signal of another circuit are the same.

12 Claims, 9 Drawing Sheets

FIG. 3

```
EXAMPLE OF REFERENCE SIGNALS HAVING THE SAME PERIODS AS EXPRESSED BY
SDC:

create_clock -name CLK1 -period 10 [get_ports CLK1]
create_clock -name CLK2 -period 10 [get_ports CLK2]
```

FIG. 4

```
CELL DESCRIPTION EXAMPLE OF LIBRARY:

module IP (input CLK1, input CLK2);
reg A ;
reg COND ;
initial begin A = 0 ; COND = 1 ; end              // Line A
always @(posedge CLK1) begin :B1                  // Line B
   if (COND == 1'b1) begin A = 1'b1 ; end         // Line C
   else begin A = 1'b0 ; end                      // Line D
end                                                // Line E
always @ (posedge CLK2) begin :B2                 // Line F
   if (A == 1'b1) begin COND = 1'b1 ; end         // Line G
   else begin COND = 1'b0 ; end                   // Line H
end                                                // Line K
endmodule                                          // Line L
```

```
CELL DESCRIPTION EXAMPLE OF LIBRARY:

always @(posedge CLK1) begin :B3          // Line A
   if (COND1 == 1'b1) begin A = 1'b1 ; end   // Line B
   else begin A = 1'b0 ; end               // Line C
end                                        // Line D
always @ (posedge CLK2) begin :B4         // Line E
   if (COND2 == 1'b1) begin A = 1'b0 ; end   // Line F
   else begin A = 1'b1 ; end               // Line G
end                                        // Line H
endmodule                                  // Line K
```

FIG. 8

```
MODIFIED EXAMPLE OF CELL DESCRIPTION OF LIBRARY BASED ON
ANALYSIS RESULT:

module IP (input CLK1, input CLK2);
reg A ;
reg COND ;
initial begin A = 0 ; COND = 1 ; end              // Line A
always @(posedge CLK1) begin :B1                  // Line B
   if (COND == 1'b1) begin A <= #1 1'b1 ; end     // Line C
   else begin A <= #1 1'b0 ; end                  // Line D
end                                               // Line E
always @ (posedge CLK2) begin :B2                 // Line F
   if (A == 1'b1) begin COND <= #1 1'b1 ; end     // Line G
   else begin COND <= #1 1'b0 ; end               // Line H
end                                               // Line K
endmodule                                         // Line L
```

FIG. 9

```
EXAMPLE IN WHICH REFERENCE SIGNALS HAVING DIFFERENT PERIODS (CLOCK
FREQUENCIES) ARE EXPRESSED BY SDC:

create_clock -name CLK1 -period 15 [get_ports CLK1]
create_clock -name CLK2 -period 20 [get_ports CLK2]
```

FIG. 10

```
EXAMPLE IN WHICH REFERENCE SIGNALS ARE DELAYED:

set_input -delay 100 CLK1
set_input -delay 100 CLK2
```

FIG. 11

```
DESCRIPTION EXAMPLE IN WHICH A PERIOD OF A REFERENCE SIGNAL AND AN INPUT
PORT DELAY OF PORT FOR THE REFERENCE SIGNAL ARE DESCRIBED:

create_clock -period 100 [get_pins axm.CLK]
set_input_delay -clock axm.CLK 2 [get_pins axm.READY]
```

FIG. 12

```
DESCRIPTION EXAMPLE OF TEST BENCH:

begin                                        // Line A
    // start at rising edge of clock         // Line B
    @(posedge axm.CLK) ;                     // Line C
      #1;                                    // Line D
      axm.ADDR = addr ;                      // Line E
        ··· (OMITTED)                        // Line F
      wait(axm.READY == 1'b1) ;              // Line G
    #1 ;                                     // Line H
     axm.DATA = data ;                       // Line K
        ··· (OMITTED)                        // Line L
```

FIG. 13

```
DESCRIPTION EXAMPLE IN WHICH A PERIOD OF A REFERENCE SIGNAL AND INPUT
PORT DELAY FOR THE REFERENCE SIGNAL ARE DESCRIBED create_clock -period 100 [get_pins axm.CLK]
set_input_delay -clock axm.CLK 1 [get_pins axm.READY]
```

LOGIC SIMULATION VERIFICATION SYSTEM, LOGIC SIMULATION VERIFICATION METHOD, AND PROGRAM

CROSS-REFERENCE TO RELATED APPLICATION

This application is based upon and claims the benefit of priority from Japanese Patent Application No. 2020-155694, filed Sep. 16, 2020, the entire contents of which are incorporated herein by reference.

FIELD

Embodiments described herein relate generally to a logic simulation verification system, a logic simulation verification method, and a program.

BACKGROUND

In a logic simulation, a logic simulator is executed using input information data including a library, a circuit description, and a test bench file which are described by a Verilog-HDL language. Furthermore, in order to avoid a signal contention state, the logic simulator may analyze whether a signal contention state is caused.

BRIEF DESCRIPTION OF THE DRAWINGS

FIG. 3 is a description example in which reference (clock) signals and corresponding periods (change intervals) are expressed in a Synopsys Design Constraint (SDC) format.

FIG. 4 is a cell description example of a library described by a Verilog-HDL language.

FIG. 8 is a modification example of a cell description of the library.

FIG. 9 is a description example in which reference signals having frequencies are expressed by SDC.

FIG. 10 is a description example in which reference signals having different periods (change intervals) as expressed by SDC are utilized.

FIG. 11 is a description example in which a period and a port delay for a reference signal are expressed by SDC.

FIG. 12 is a description example of a test bench in which a change possibility time and a reference possibility time are changed in a begin-end circuit block.

FIG. 13 is a description example in which a period and a port delay for a reference signal are expressed by SDC.

DETAILED DESCRIPTION

Figure 1:
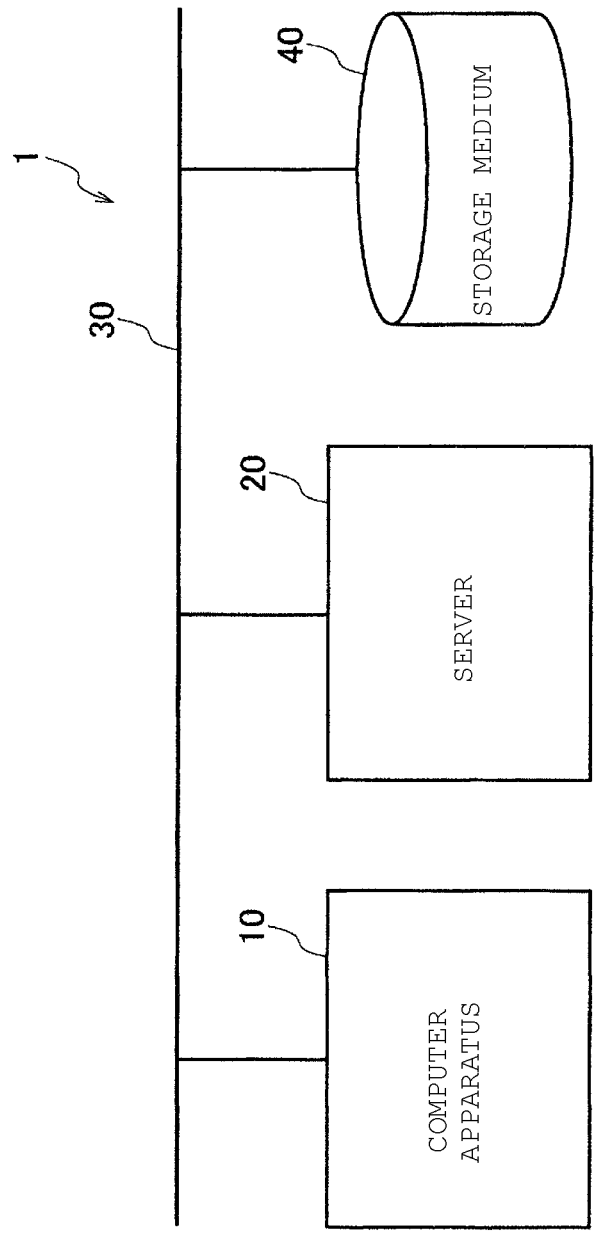
FIG. 1 is a schematic diagram illustrating a configuration of a logic simulation verification system according to an embodiment.

Embodiments provide a logic simulation verification system, a logic simulation verification method, and a program capable of providing the same logic simulation result for each logic simulator in a short time.

In general, according to one embodiment, a logic simulation verification system that verifies a change of a signal described in a library, a circuit description, and a test bench in accordance with a reference signal is provided. The logic simulation verification system include: a change timing designation unit configured to designate a reference signal and a change timing for the reference signal; a change possibility time calculation unit configured to calculate a first time for which there is a possibility that a first signal to be assigned to a variable described in the library, the circuit description, and the test bench is changed in accordance with the change timing for the reference signal; a reference possibility time calculation unit configured to calculate a second time for which there is a possibility that a second signal assigned a variable described in the library, the circuit description, and the test bench is checked in accordance the change timing for the reference signal; a change possibility time determination unit configured to determine whether different circuits for which first signals are the same have first times that match; and a change/reference possibility time determination unit configured to determine whether a first time and a second time match with each other when a first signal of one circuit and a second signal of another circuit are the same.

Next, certain example embodiment will be described with reference to the drawings. In the following description of the drawings, the same or similar components are designated by the same or similar reference numerals. The drawings are schematic diagrams.

In the following embodiments exemplify apparatuses and methods presented for explaining certain technical concepts of the present disclosure. Various modifications may be made to the example embodiments while still embodying and/or incorporating the technical concepts of the present disclosure.

In the following description, a Synopsys design constraint format (SDC) notation (1'b1) and (1'b0) may be more simply referred to as SDC values 1 and 0, respectively. In this context, SDC is a reference format for describing a timing constraint as published by Synopsys. In "1'b1", 1' indicates a 1-bit length, b indicates binary (binary number), and last 1 indicates a value.

First Embodiment

FIG. 1 is a schematic diagram illustrating a configuration of a logic simulation verification system 1 according to an embodiment. As illustrated in FIG. 1, the logic simulation verification system 1 includes a computer apparatus 10, a server 20, a network 30, and a storage medium 40.

In the logic simulation verification system 1, the computer apparatus 10, which can be operated by a user, a server 20 that stores a computer program used for the logic simulation verification system 1, and the storage medium 40 are connected via the network 30. The storage medium 40 stores input information data which is required for executing the computer program used for logic simulation verification and also a verification result message.

The computer apparatus 10 may be, for example, a personal computer (PC), a thin client terminal, a mobile terminal, or a personal digital assistant (PDA). The server 20 may be, for example, an engineering workstation, a main frame, or a supercomputer. The network 30 may be, for example, the Internet, an intranet, a LAN, a telephone communication network, or a dedicated line. The storage medium 40 may be, for example, an external hard-disk-type storage device, a memory-type semiconductor storage device, or a storage medium (media). The storage medium 40 is not limited to these examples.

Figure 2:
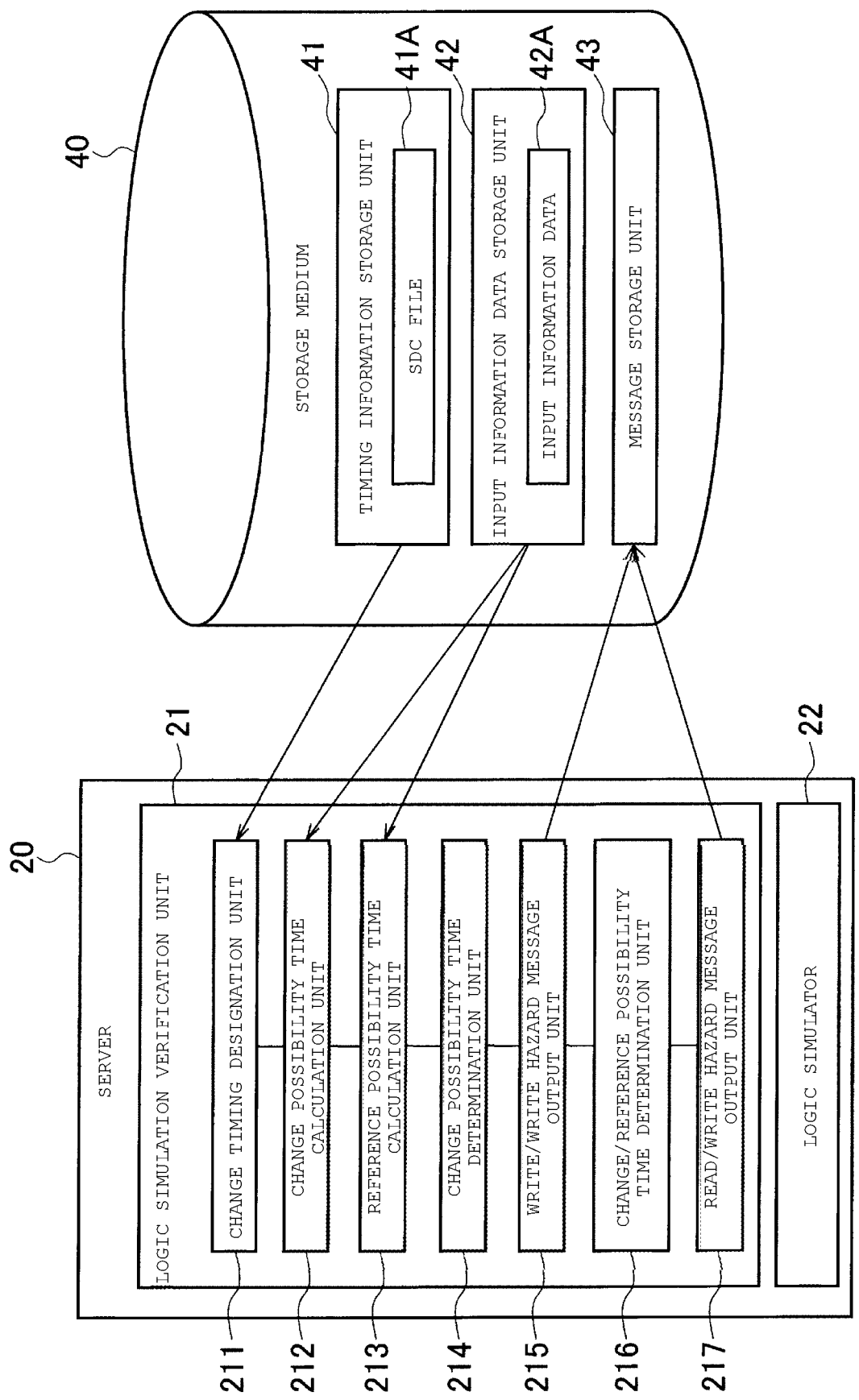
FIG. 2 is a functional block configuration diagram of a server and a storage medium of a logic simulation verification system according to an embodiment.

FIG. 2 is a block diagram illustrating a configuration example of the server 20 and the storage medium 40 of a logic simulation verification system 1 according to an embodiment. As illustrated in FIG. 2, the server 20 includes a logic simulation verification unit 21 that executes a computer program used for the logic simulation verification system 1, and a logic simulator 22 that executes a computer program used for logic simulation.

The logic simulation verification unit 21 may be, for example, a processor such as a central processing unit (CPU) or a microprocessor, or a semiconductor integrated circuit (IC) having the same functions as described for the processor. The logic simulation verification unit 21 is not limited to these examples.

The logic simulation verification unit 21 includes a change timing designation unit 211, a change possibility time calculation unit 212, a reference possibility time calculation unit 213, a change possibility time determination unit 214, and a write/write hazard message output unit 215, a change/reference possibility time determination unit 216, and a read/write hazard message output unit 217. In the following description, a write/write hazard and a read/write hazard are referred to as a WW hazard and a RW hazard.

The storage medium 40 includes a timing information storage unit 41, an input information data storage unit 42, and a message storage unit 43.

The timing information storage unit 41 stores, for example, a file in which a reference signal and change information for the reference signal are expressed by SDC. The reference signal can be used for determining when a change of a signal will occur. In the following description, the file in which the reference signal and the change information for the reference signal are expressed by SDC is called an SDC file 41A. The reference signal is also called a timing reference signal or a clock signal. The change information for the reference signal may be called a change timing, and may correspond to a period or a frequency or the like of a repetitive clock signal.

The SDC file 41A is input information data required for executing a computer program used for the logic simulation verification system 1. In the present embodiment, a SDC file 41A is input information data required for executing the logic simulator 22.

FIG. 3 is a specific description example in which a reference signal and change information are expressed by SDC. The reference signal and the change information are stored in the timing information storage unit 41 according to the present embodiment.

As illustrated in FIG. 3, the timing information storage unit 41 stores information about the reference signal, such as a signal name, a clock period for the signal, and a node name of the input signal. This information is input to a library, a circuit description, and a test bench file described by a Verilog-HDL (Hardware Description Language) language.

The input information data storage unit 42 stores, for example, a library, a circuit description, and a test bench file which are described by a Verilog-HDL language. In the following description, the library, the circuit description, and the test bench file described by a Verilog-HDL language can be referred to collectively as input information data 42A.

The input information data 42A is the input information data required for executing a computer program used for the logic simulation verification system 1. In the present example, the input information data 42A is input information data required for executing the logic simulator 22.

The message storage unit 43 stores a message to be output from the write/write hazard message output unit 215 or the read/write hazard message output unit 217 in the logic simulation verification unit 21. The WW hazard and the RW hazard will be described further below.

When the input information data includes the library, the circuit description, and the test bench, a signal contention state (a conflicting result) may result in a logic simulation due to a RW hazard and/or a WW hazard, and as a result, different simulation results may be obtained for different simulations from the logic simulator 22 using the same input information. The signal contention state is a signal state in which there is a possibility that signals are changed at the same time and thus a malfunction (or an operation not intended by a designer) would be caused in a logic circuit.

Next, the RW hazard that causes different logic simulation results from the same input information will be described.

FIG. 4 is a specific cell description example of a library stored in the input information data storage unit 42 according to the embodiment.

In FIG. 4, an always block circuit B1 is described from a Line B to a Line E, and an always block circuit B2 is described from a Line F to a Line K. In the following description, the always block circuit B1 and the always block circuit B2 are referred to as a circuit B1 and a circuit B2.

The circuit B1 operates at a rising edge of CLK1, and when a variable COND is equal to 1, then 1 will assigned to a variable A (Line C). When the variable COND is equal to 0, then 0 is assigned to the variable A (Line D).

The circuit B2 operates at a rising edge of CLK2, and when the variable A is equal to 1, then 1 is assigned to the variable COND (Line G). When the variable A is equal to 0, then 0 is assigned to the variable COND (Line H).

In the following description, the signal which is assigned to a variable in accordance with a timing of a reference signal and in accordance with the change for the reference signal is called a first signal.

That is, for the above description, the value 1 or 0 assigned to the variable A by the circuit B1 is an output signal of the circuit B1, and is an example of a first signal. Similarly, the value 1 or 0 assigned to the variable COND by the circuit B2 is an output signal of the circuit B2, and is another example of a first signal.

Furthermore, the signal supplying a variable value in accordance with a timing of a reference signal and in accordance with the change for the reference signal is called a second signal.

That is, the value 1 or 0 of the variable COND supplied to (or checked by) the circuit B1 is an input signal of the circuit B1, and is an example of a second signal. Similarly, the value 1 or 0 of the variable A supplied to (or checked by) the circuit B2 is an input signal of the circuit B2, and is another example of a second signal.

The clock periods of CLK1 and CLK2 used as the reference signals in the circuit B1 and the circuit B2 can be the same. There is a possibility that the variable A of the circuit B1 and the variable COND of the circuit B2 (as the first signals of the circuit B1 and the circuit B2) will both be changed at corresponding rising edges of CLK1 and CLK2.

Furthermore, the variable A (as a first signal of the circuit B1) and the variable A (as a second signal of the circuit B2) are the same variable shared between the different circuits. Similarly, the variable COND (as a first signal of the circuit B2) and the variable COND (as a second signal of the circuit B1) are the same variable shared between the different circuits. For this reason, end state values for the variable A and the variable COND may differ depending on whether the circuit B1 is first evaluated or the circuit B2 is first evaluated.

Specifically, when the circuit B1 is first evaluated, there is a possibility that the circuit B1 operates at a rising edge of CLK1 and the variable COND is referred (supplied) to the circuit B1. When the variable COND is 1 at this time, the circuit B1 operates to assign 1 to the variable A, which output as a first signal.

Next, there is a possibility that the circuit B2 operates at a rising edge of CLK2 and the variable A is input to the circuit B2. When the variable A is 1, the circuit B2 operates to assign 1 to the variable COND. Thereby, at the end of this evaluation of circuit B1 and circuit B2 the variable A is 1, and the variable COND is 1.

However, when the circuit B2 is first evaluated, circuit B2 operates at a rising edge of CLK2 and the variable A is input to the circuit B2. When the variable A is 0 at this time, the circuit B2 assigns 0 to the variable COND.

Next, circuit B1 can operate at a rising edge of CLK1 and the variable COND is input. When the variable COND is 0 at this time, the circuit B1 assigns 0 to the variable A. Thereby, at the end of this evaluation of circuit B1 and circuit B2, the variable A is 0, and the variable COND is 0.

As described above, when the logic simulation is executed using the SDC file 41A described in FIG. 3 and the input information data 42A including the library described in FIG. 4, the simulation results will differ depending on whether the circuit B1 is first evaluated or the circuit B2 is first evaluated.

A state where there is a possibility that a second signal can be input (or read) and the resulting first signal is changed (or written) even though the reference signals are the same is called a RW hazard.

Next, the WW hazard that causes different logic simulation results will be described.

Figures 5, 6:
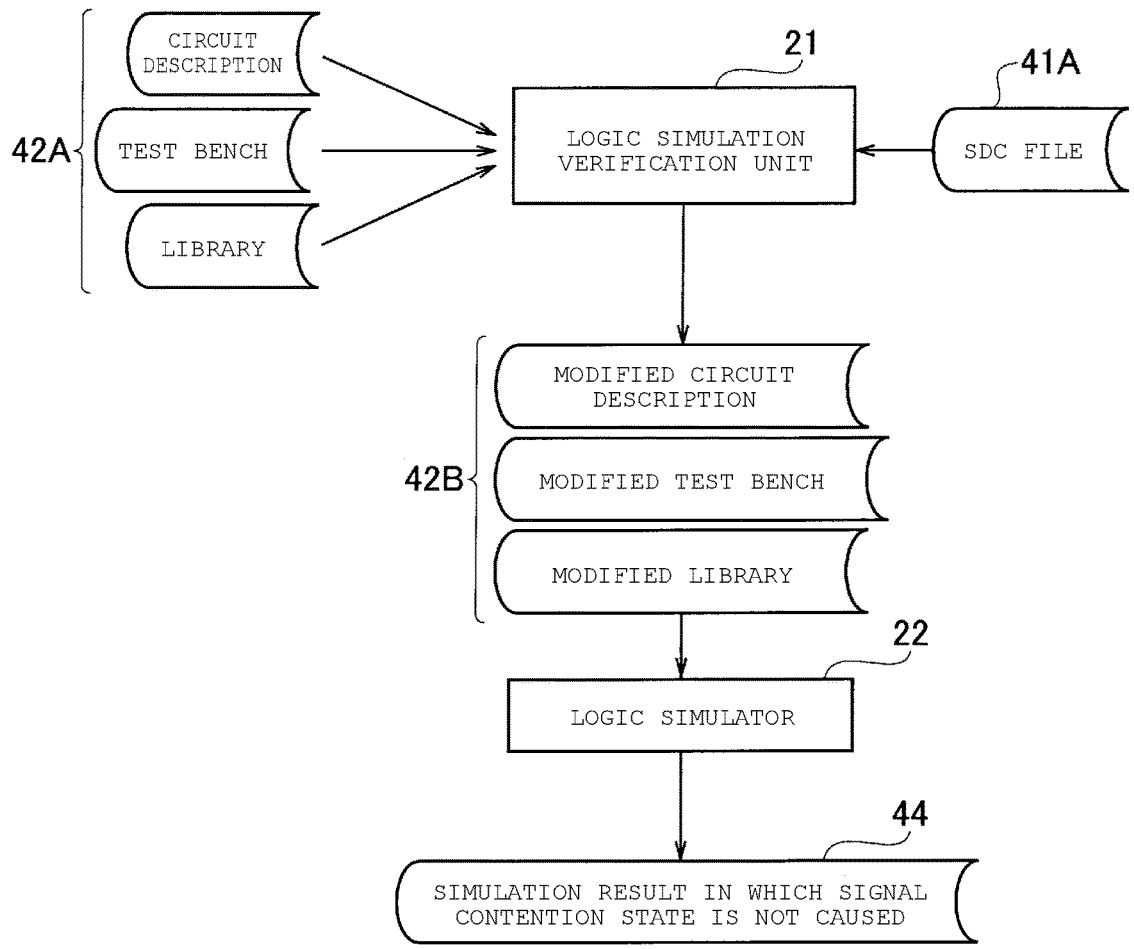
FIG. 5 is a specific cell description example of a library in which there is a possibility that signals to be assigned are changed between a plurality of circuits.
FIG. 6 is a block diagram of a system using a logic simulation verification system according to an embodiment.

FIG. 5 is a specific cell description example of a library according to an embodiment in which there is a possibility that signals assigned to variables of a plurality of circuits are changed.

In FIG. 5, an always block circuit B3 is described from a Line A to a Line D, and an always block circuit B4 is described from a Line E to a Line H. In the following description, in FIG. 5, the always block circuit B3 and the always block circuit B4 are referred to as a circuit B3 and a circuit B4.

The circuit B3 operates at a rising edge of CLK1, and when a variable COND1 is 1, then 1 is assigned to a variable A (Line B). When the variable COND1 is 0, then 0 is assigned to the variable A (Line C).

The circuit B4 operates at a rising edge of CLK2, and when a variable COND2 is 1, then 0 is assigned to a variable A (Line F). When the variable COND2 is 0, then 1 is assigned to the variable A (Line G).

The clock periods of CLK1 and CLK2 in the circuit B3 and the circuit B4 can be the same. Furthermore, as illustrated in FIG. 5, the first signals for the circuit B3 and the circuit B4 are the same variable A.

There is a possibility that, in accordance with a reference signal, the variable A (as the first signal of both the circuit B3 and the circuit B4) will be changed at rising edges of CLK1 and CLK2. For this reason, end state results for the variable A differ depending on whether the circuit B3 is first evaluated or the circuit B4 is first evaluated.

Specifically, when the circuit B3 is first evaluated, there is a possibility that the circuit B3 operates at a rising edge of CLK1 and the variable COND1 is input. When the variable COND1 is 1, the circuit B3 assigns 1 to the variable A.

Next, there is a possibility that the circuit B4 operates at a rising edge of CLK2 and the variable COND2 is input. When the variable COND2 is 1, the circuit B4 assigns 0 to the variable A. Thereby, the variable A is 0 and the end of the evaluation.

However, when the circuit B4 is first evaluated, there is a possibility that the circuit B4 operates at a rising edge of CLK2 and the variable COND2 a is input. When the variable COND2 is 1, the circuit B4 assigns 0 to the variable A.

Next, there is a possibility that the circuit B3 operates at a rising edge of CLK1 and the variable COND1 is input. When the variable COND1 is 1, the circuit B3 assigns 1 to the variable A. Thereby, the variable A is 1 at the end of this evaluation.

As described above, when the logic simulation is executed using the same SDC file 41A described in FIG. 3 and the input information data 42A including the library described in FIG. 5, the simulation results differ depending on whether the circuit B3 is first evaluated or the circuit B4 is first evaluated.

A state where there is a possibility that the first signal is changed (written) even though the reference signals are the same is called a WW hazard.

The logic simulation verification unit 21 according to the embodiment will be described.

FIG. 6 is a block diagram of a system incorporating the logic simulation verification system 1 according to an embodiment.

As illustrated in FIG. 6, the logic simulation verification unit 21 performs a static analysis using the SDC file 41A and the input information data 42A including the library, the circuit description, and the test bench.

In this context, static analysis means verifying a possibility that a first signal is changed and a second signal is input in accordance with the reference signal and the change of the reference signal without using the logic simulator 22.

The change timing designation unit 211 designates reference signals and the period of the reference signals, which are stored in the timing information storage unit 41 of the storage medium 40. The change timing designation unit 211 designates, for example, CLK1 and CLK2 as the reference signals, as illustrated in the description example of FIG. 3.

The change possibility time calculation unit 212 reads the input information data 42A including the library, the circuit description, and the test bench stored in the input information data storage unit 42 of the storage medium 40.

The change possibility time calculation unit 212 calculates when a signal assigned to a variable might change based on the input information data 42A. The change possibility time is a time at which the first signal might be changed in accordance with the timing of the reference signal. In the following description, the change possibility time for a signal assigned to a variable is referred to as a "first time." That is, a "first time" is when a circuit outputs a variable at a particular value.

Specifically, as illustrated in FIG. 5, the first time for the circuit B3 is the time at which there is a possibility that an output signal value is assigned to the variable A at rising edges of CLK1 and CLK2 (as the reference signals). Similarly, the first time for the circuit B4 is a time at which there is a possibility that an output signal value is assigned to the variable A.

The reference possibility time calculation unit 213 reads the input information data 42A including the library, the circuit description, and the test bench stored in the input information data storage unit 42.

The reference possibility time calculation unit 213 calculates a time at which a second signal (corresponding to a variable) is checked in accordance with the change of the reference signal based on the input information data of the input information data 42A. In the following description, the reference possibility time for the signal corresponding to the variable being input/checked/evaluated is referred to as a "second time." That is, a "second time" is when a circuit receives or checks (references) a particular variable value to use as an input value or the like.

Specifically, as illustrated in FIG. 4, with respect to the rising edges of CLK1 and CLK2 (as the reference signals), the second time of the circuit B1 is the time at which there is a possibility that the variable COND as the input signal is received and the output signal is assigned the variable A. Similarly, the second time of the circuit B2 is a time at which there is a possibility that the variable A as the input signal is received and the output signal is assigned the variable COND.

When the first signals of different circuits are the same at the change of the reference signal, the change possibility time determination unit 214 then determines whether the first times (when the first signals might be changed) match with each other by comparing the first times.

The different circuits are, for example, the always block circuit B3 from Line A to Line D illustrated in FIG. 5 and the always block circuit B4 from Line E to Line H illustrated in FIG. 5.

When the change possibility time determination unit 214 determines that the first times match with each other across different circuits, the write/write hazard message output unit 215 outputs a message to the message storage unit 43 of the storage medium 40 indicating that there is a possibility that a WW hazard occurs. Further, when the change possibility time determination unit 214 determines that the first times do not match with each other across different circuits, the write/write hazard message output unit 215 outputs a message, to the message storage unit 43 of the storage medium 40 indicating that there is no problem.

When the first signal of one circuit and the second signal of another circuit are the same, the change/reference possibility time determination unit 216 checks whether there is a possibility that the first time and the second time can be the same time. In this context, the first time is a time at which there is a possibility that the first signal might be changed in accordance with the reference signal timing, and the second time is a time at which the second signal is received/checked in accordance with the reference signal timing.

When the change/reference possibility time determination unit 216 determines that the first time of one circuit and the second time of another circuit are the same time, the read/write hazard message output unit 217 outputs a message to the message storage unit 43 of the storage medium 40 indicating that there is a possibility that a RW hazard occurs. When the change/reference possibility time determination unit 216 determines that the first time of one circuit and the second time of another circuit are different, the read/write hazard message output unit 217 outputs a message, to the message storage unit 43 of the storage medium 40 indicating that there is no problem.

The logic simulator 22 performs a dynamic analysis using, for example, the input information data stored in the timing information storage unit 41 and the input information data storage unit 42. In this context, dynamic analysis is an analysis performed using the logic simulator 22. The logic simulation verification unit 21 may verify a signal contention state and then perform a dynamic analysis using input information data 42B including a modified library, a modified circuit description, and a modified test bench. The internal configuration of the logic simulator is known, and thus a description of the internal configuration will be omitted.

Figure 7:
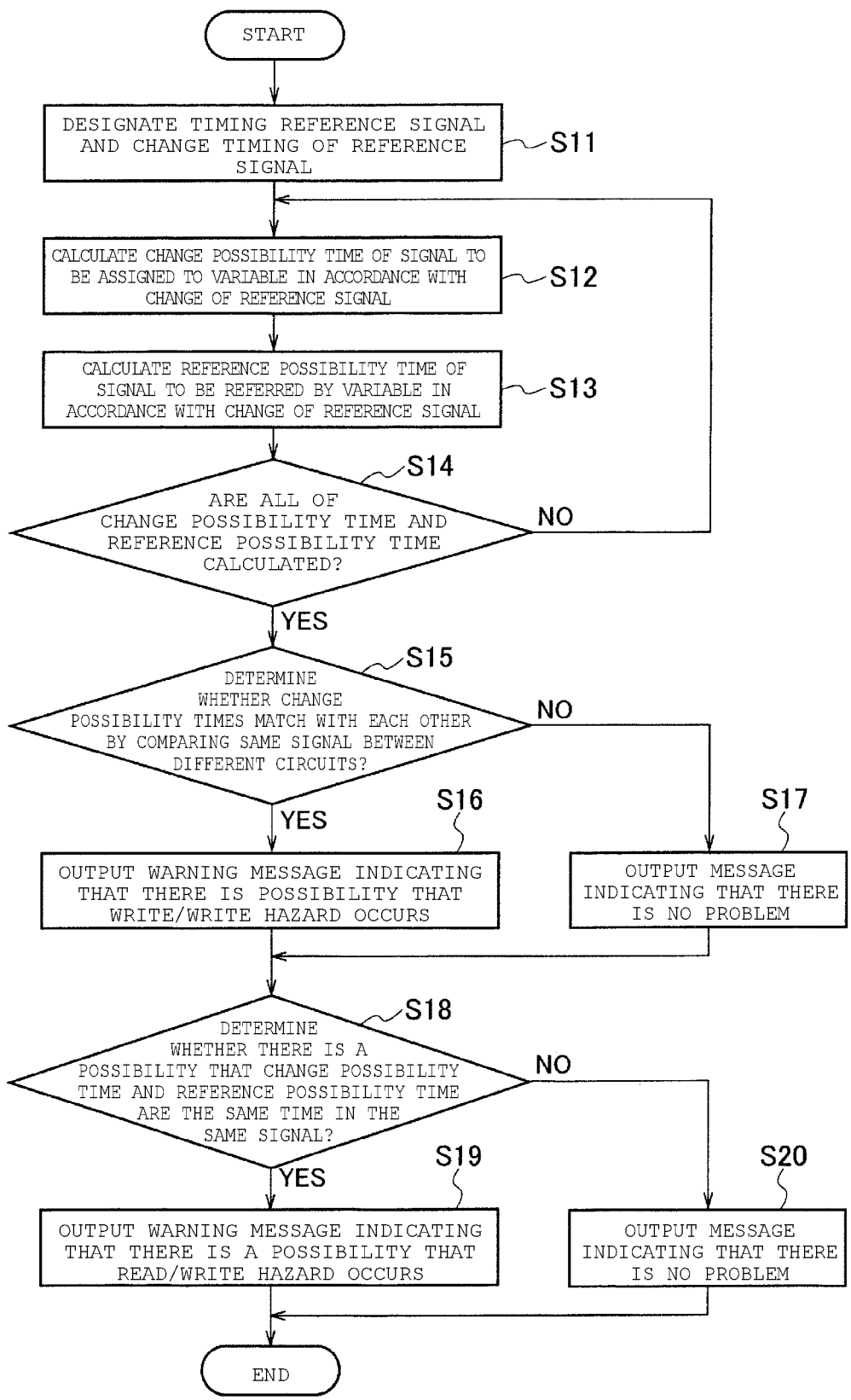
FIG. 7 is a flow chart of a logic simulation verification system according to an embodiment.

FIG. 7 is an operation flow chart of the logic simulation verification system 1 according to an embodiment.

A logic simulation verification method of the logic simulation verification system 1 according to an embodiment will be described with reference to FIGS. 2, 6, and 7.

In step S11, the change timing designation unit 211 reads the SDC file 41A. The change timing designation unit 211 designates the reference signal and the change information (e.g., the clock period) from the SDC file 41A.

In step S12, the change possibility time calculation unit 212 reads the input information data 42A including the library, the circuit description, and the test bench. The change possibility time calculation unit 212 calculates a first time (the time at which there is a possibility that the first signal will be changed) in accordance with the reference signal and the corresponding period of the reference signal designated in step S11, based on the input information data 42A.

In step S13, the reference possibility time calculation unit 213 reads the input information data 42A including the library, the circuit description, and the test bench. The reference possibility time calculation unit 213 calculates a second time (the time at which there is a possibility that the second signal is received) in accordance with the reference signal and corresponding period of the reference signal designated in step S11, based on the input information data 42A.

In step S14, when all of the first times and the second times are calculated by the change possibility time calculation unit 212 and the reference possibility time calculation unit 213, the process proceeds to step S15. If all the first times and the second times are not yet calculated by the change possibility time calculation unit 212 and the reference possibility time calculation unit 213, the process returns to step S12.

In step S15, when the first signals of different circuits are the same, the change possibility time determination unit 214 checks whether the respective first times (the times at which there is a possibility that the first signals might be changed) match with each other by comparing the first times. When the first times match with each other, the change possibility time determination unit 214 proceeds to step S16. When the first times do not match with each other, the process proceeds to step S17.

In step S16, when the change possibility time determination unit 214 determines that the first times match with each other, the write/write hazard message output unit 215 outputs a message indicating that there is a possibility that a WW hazard occurs. After the output, the process proceeds to step S18.

In step S17, when the change possibility time determination unit 214 determines that the first times do not match with each other, the write/write hazard message output unit 215 outputs a message indicating that there is no problem. After the output, the process proceeds to step S18.

In step S18, when the first signal of one circuit and the second signal of another circuit are the same, the change/reference possibility time determination unit 216 determines whether there is a possibility that a first time and a second time are the same time, the first time in this context being a time at which there is a possibility that the first signal is changed, and the second time in this context being a time at which there is a possibility that the second signal is received.

When the change/reference possibility time determination unit 216 determines that there is a possibility that a first time and a second time are the same time, the process proceeds to step S19. When there is no possibility that a first time and a second time are the same time, the process proceeds to step S20.

In step S19, when the change/reference possibility time determination unit 216 determines that there is a possibility that the first time of one circuit and the second time of another circuit are the same time, the read/write hazard message output unit 217 outputs a message indicating that there is a possibility that a RW hazard occurs. After the output, the process is ended.

In step S20, when the change/reference possibility time determination unit 216 determines that the first time of one circuit and the second time of another circuit will be different, the read/write hazard message output unit 217 outputs a message indicating that there is no problem. After the output, the process is ended.

The user receives or checks for a warning message in the message storage unit 43 indicating that there is a possibility that a WW hazard and/or a RW hazard occurs, and then modifies the input information data 42A. The modified file is referred to as the input information data 42B and includes the modified library, the modified circuit description, and the modified test bench.

FIG. 8 is a specific modification example of a RW hazard in the cell description of the library of FIG. 4 according to the embodiment. For example, in accordance with the reference signal of the SDC file 41A of FIG. 3, the logic simulation verification system 1 is executed by the user using the cell description example of the library of FIG. 4 in which there is a possibility that a RW hazard occur. The user refers to a message indicating that there is a possibility that a RW hazard occurs and corresponding to an analysis result obtained by executing the logic simulation verification system 1.

Specifically, the analysis result of the logic simulation verification system 1 includes a warning message for the library of FIG. 4, the warning message being a message indicating that there is a possibility that the variable A as the first signal of the circuit B1 described in the library illustrated in FIG. 4 is changed in accordance with the reference signal illustrated in FIG. 3 and the change of the reference signal at a first time (in the example, the first times occur every tenth reference clock cycle, thus corresponds to a counter value (time value) based on the reference clock cycle having a remainder of zero when divided by 10). Similarly, the analysis result includes a warning message for the library of FIG. 4, the warning message being a message indicating that there is a possibility that the variable COND as the first signal of the circuit B2 described in the library illustrated in FIG. 4 is changed in accordance with the reference signal illustrated in FIG. 3 and the change of the reference signal at a first time (in the example, the first times occur every tenth reference clock cycle).

Further, the analysis result includes a warning message for the library of FIG. 4 indicating that there is a possibility that the variable COND (which is the second signal of the circuit B1 described in the library illustrated in FIG. 4) is checked in accordance with the reference signal(s) illustrated in FIG. 3 and changed at a second time (in the example, the second times occur every tenth reference clock cycle). Similarly, the analysis result includes a warning message for the library of FIG. 4, the warning message being a message indicating that there is a possibility that the variable A (which is the second signal of the circuit B2 described in the library illustrated in FIG. 4) is checked in accordance with the reference signal illustrated in FIG. 3 at a second time (in the example, occur every tenth reference clock cycle).

As described above, when the reference signals are the same (a time when the first time and the second time match), there is a possibility that the second signal of one circuit is read and then the first signal of another circuit is changed. Thus, a message based on the analysis result and indicating that a signal contention state would occur is output.

The user refers to the message based on the analysis result indicating that there is a possibility that a RW hazard occurs, and modifies, as illustrated in FIG. 8, "A=1'b1;" as an assignment description in Line C to "A<=#1 1'b1;" since there is a possibility that a RW hazard occurs in the circuit B1 and the circuit B2. Similarly, the user modifies "COND=1'b1;" as an assignment description in Line G, to "COND<=#1 1'b1;". "A<=#1 1'b1;" is a description for delaying a time when 1 is assigned to the variable A by 1. For example, # is a symbol representing a delay time.

That is, when the time is delayed by 1 when the first signal is assigned to the variable, the first time when the first signal is changed occurs when a counter value based on the reference clock cycle has a remainder of 1 when divided by 10 (that is, one reference clock cycle after every tenth). The second times (when the second signal is checked) corresponds occur every tenth reference clock cycle.

Thus, since the first time and the second time now do not match with each other, it will be determined that there is no possibility that a signal contention state occurs between different circuits.

As described above, the logic simulation verification system 1 can avoid a signal contention state, which may be caused by the reference signal and the change of the reference signal, by using the logic simulation verification method.

In addition, the logic simulation verification system 1 can execute a static analysis in a short time and with a low memory usage, without using the logic simulator 22.

Further, the logic simulation verification system 1 can handle the delay time by handling the time when the first signal is assigned to the variable and the time when the second signal is referred by the variable in accordance with the reference signal and the change of the reference signal.

The logic simulator 22 can obtain a simulation result in which a signal contention state is not caused by executing a logic simulation using the input information data 42B including the modified library, the modified circuit description, and the modified test bench which are modified by the logic simulation verification system 1.

Second Embodiment

The logic simulation verification system 1 according to a second embodiment will be described.

FIG. 9 is a specific description example in which reference signals having different frequencies are expressed by SDC, the reference signals are stored in the timing information storage unit 41 according to the second embodiment.

The logic simulation verification system 1 according to the second embodiment is an example of verifying a library for the reference signals having different frequencies.

The logic simulation verification system 1 according to the second embodiment stores a description example in which the reference signals having different frequencies illustrated in FIG. 9 are expressed by SDC, in the timing information storage unit 41.

That is, for example, in the description example of the library illustrated in FIG. 4, in the case of the reference signals having the frequencies illustrated in FIG. 9, in step S12 illustrated in FIG. 7, the change possibility time calculation unit 212 of the logic simulation verification system 1 according to the second embodiment calculates the first times at which there is a possibility that the first signal will be changed within a time that is the least common multiple of the different clock periods of the reference signals. Specifically, in FIG. 9, the signal clock period of reference signal CLK1 is 15 nanoseconds (ns), and the signal clock period of the other reference signal CLK2 is 20 ns.

Here, the least common multiple of the clock periods of CLK1 and CLK2 is 60. When at times 0, 15, 20, 30, 40, and 45 within the least common multiple value of 60, a signal contention state may be caused.

In the case of the library illustrated in FIG. 4, the first times for the variable A of the circuit B1 occur at counts of 0, 15, 30, and 45 within the periods between time values having a remainder of 0 when dividing the time of the reference signal CLK1 by 60. Further, the first times for the variable COND of the circuit B2 occur at counts of 0, 20, and 40 within periods between time values having a remainder of 0 when dividing the time of the reference signal CLK2 by 60.

In step S13, the reference possibility time calculation unit 213 calculates the second times at which there is a possibility that the second signal is checked within a time of a least common multiple of the clock periods of the reference signals.

That is, the second times for the variable COND of the circuit B1 occur at counts of 0, 15, 30, and 45 within the periods between time values having a remainder of 0 when dividing the time of the reference signal CLK1 by 60. Further, the second times for the variable A of the circuit B2 occur at counts of 0, 20, and 40 having a remainder of 0 within periods between time values having a remainder of 0 when dividing the time of the reference signal CLK2.

When the remainder obtained when dividing the time of the reference signal by 60 is 0, there is a possibility that the first signals of the different circuits B1 and B2 are changed at the same time and the second signals of the different circuits B1 and B2 are checked at the same time. Thus, in step S18, it is determined that a signal contention state may be caused by the change of the reference signal.

Other configurations of the logic simulation verification system, the logic simulation verification method, and effects are the substantial same as those of the first embodiment illustrated in FIGS. 1 to 8.

Third Embodiment

The logic simulation verification system 1 according to a third embodiment will be described.

FIG. 10 is a specific description example in which change timings of the reference signals are set without reference to periodicity of the clock signals are expressed by SDC. These reference signals are stored in the timing information storage unit 41 according to the third embodiment. As illustrated in FIG. 10, the logic simulation verification system 1 according to the third embodiment is operated in an example in which power is supplied when each of the reference signals CLK1 and CLK2 reaches a time of 100 (e.g., after a delay of 100 clock cycles or other arbitrary units of counting).

The logic simulation verification system 1 according to the third embodiment stores a description example in which the change timings illustrated in FIG. 10 are expressed by SDC in the timing information storage unit 41.

That is, for example, in the description example of the library illustrated in FIG. 4, when the reference signals illustrated in FIG. 10 are utilized, in step S12 illustrated in FIG. 7, the change possibility time calculation unit 212 of the logic simulation verification system 1 according to the third embodiment calculates the first time at which there is a possibility that the variable A (as the first signal of the circuit B1) is changed when the reference signal CLK1 reaches a time of 100. Similarly, the change possibility time calculation unit 212 calculates the first time at which there is a possibility that the variable COND (as the first signal of the circuit B2) is changed when the reference signal CLK2 reaches a time of 100.

In step S13, the reference possibility time calculation unit 213 calculates the second time at which there is a possibility that the variable COND (as the second signal of the circuit B1) is checked/referenced when the reference signal CLK1 reaches a time of 100. Similarly, the reference possibility time calculation unit 213 calculates the second time at which there is a possibility that the variable A (as the second signal of the circuit B2) is checked/referenced when the reference signal CLK2 reaches a time of 100.

When the reference signal is at a time of 100, there is a possibility that the first signals of the different circuits B1 and B2 are changed at the same time and the second signals of the different circuits B1 and B2 are also referenced at the same time. Thus, in step S18, it is determined that a signal contention state may be caused by a change of the reference signal.

Other configurations of the logic simulation verification system, the logic simulation verification method, and effects are the same as those of the first embodiment illustrated in FIGS. 1 to 8.

Fourth Embodiment

The logic simulation verification system 1 according to a fourth embodiment will be described.

FIG. 11 is a specific description example in which change timings of the reference signals are expressed by SDC. The reference signals are stored in the timing information storage unit 41 according to the fourth embodiment.

FIG. 12 is a specific description example of a test bench in which a variable change possibility time and a variable reference possibility time are changed by SDC functions "@" and "wait" in a begin-end circuit block, the test bench being stored in the input information data storage unit 42 according to the fourth embodiment.

As illustrated in FIGS. 11 and 12, in an example in which the first time and the second time are changed in accordance with the reference signal axm.CLK when "@" and "wait" are included in the description of the test bench, the logic simulation verification system 1 according to the fourth embodiment is operated.

The logic simulation verification system 1 according to the fourth embodiment stores an SDC file 41A as a description example in which the reference signals (and the corresponding change timings) illustrated in FIG. 11 are expressed by SDC in the timing information storage unit 41.

Further, the input information data 42A including the test bench illustrated in FIG. 12 is stored in the input information data storage unit 42.

In FIG. 11, a signal clock period, a node name of the input signal, and input delay information for an input pin for the clock are described. In a second line, it is designated that a change timing of a variable axm.READY is delayed by 2 (for example, a remainder when dividing a counter value for the reference signal by 100 is 2).

As illustrated in FIG. 12, the reference signal axm.CLK is at a rising edge when a remainder when dividing counter value of the reference signal axm.CLK by 100 is 0 (Line C). Next, the reference signal is delayed by an assignment statement (Line D). When the remainder when dividing the time of the reference signal axm.CLK by 100 is 1, the value "addr" is assigned to a variable axm.ADDR (Line E). At Line G, the process proceeds to the next line, Line H, when the variable axm.READY is 1. When the variable axm.READY is 0, the process waits until the variable axm.READY is 1. At a time at which the remainder when dividing counter value of the reference signal axm.CLK by 100 is 2, the process proceeds to the next line, Line H. Next, the reference signal is delayed by an assignment statement (Line H). When the remainder when dividing counter value of the reference signal axm.CLK by 100 is 2 or 3, the value "data" is assigned to a variable axm.DATA (Line K).

When the logic simulation verification system is executed and an analysis is performed using the input information data of FIGS. 11 and 12, in step S12 illustrated in FIG. 7, the change possibility time calculation unit 212 calculates the first time at which there is a possibility that the variable axm.ADDR is changed in accordance with the reference signal axm.CLK. In addition, the change possibility time calculation unit 212 calculates the first time at which there is a possibility that the variable axm.DATA is changed.

That is, when the remainder when dividing the time of the reference signal axm.CLK by 100 is 1, there is a possibility that the variable axm.ADDR will be changed. In addition, when the remainder when dividing the counter value of the reference signal axm.CLK by 100 is 2 or 3, there is a possibility that the variable axm.DATA will be changed.

In step S13, the reference possibility time calculation unit 213 calculates the second time at which there is a possibility that the variable axm.READY (as a second signal) will be checked/referenced in accordance with the reference signal axm.CLK.

That is, when the remainder when dividing the counter value of the reference signal axm.CLK by 100 is 1 and the value of the variable axm.READY is also 1, the process proceeds to the next line. If the remainder when dividing the counter value of the reference signal axm.CLK by 100 is 1 and the value of the variable axm.READY is 0, the process is stopped. When the remainder when dividing the counter value of the reference signal axm.CLK by 100 is 2, there is a possibility that the value of the variable axm.READY will be 1 and thus, the process proceeds to the next line.

In step S18, when the remainder when dividing the counter value of the reference signal axm.CLK by 100 is 2, there is a possibility that the value of the variable axm.READY is changed. In step S18, when the remainder when dividing the counter value of the reference signal axm.CLK by 100 is 1, there is a possibility that the variable axm.READY is checked/referenced. Therefore, it is determined that a signal contention state related to the variable axm.READY is not caused.

Other configurations of the logic simulation verification system, the logic simulation verification method, and effects are substantially the same as those of the first embodiment illustrated in FIGS. 1 to 8.

Fifth Embodiment

The logic simulation verification system 1 according to a fifth embodiment will be described.

FIG. 13 is a specific description example in which change timings of the reference signals are expressed by SDC and based on a description example of a test bench to be checked, the reference signals being stored in the timing information storage unit 41 according to the fifth embodiment. On the lower line, it is designated that a change timing of a variable axm.READY is delayed by 1 (for example, a remainder when dividing the counter value of the reference signal by 100 is 1).

As illustrated in FIGS. 11 and 13, in an example in which the first time and the second time are changed in accordance with the reference signal axm.CLK when "@" and "wait" are included in the description of the test bench, the logic simulation verification system 1 according to the fifth embodiment is operated.

The logic simulation verification system 1 according to the fifth embodiment stores an SDC file 41A as a description example in which the change timings of the reference signals illustrated in FIG. 13 are expressed by SDC, in the timing information storage unit 41. Further, the input information data 42A including the test bench illustrated in FIG. 12 is stored in the input information data storage unit 42.

As illustrated in FIG. 13, in the description example input delay information of a clock input pin is changed from 2 to 1, the logic simulation verification system 1 according to the fifth embodiment is operated.

When the logic simulation verification system is operated and an analysis is performed using the input information data of FIGS. 12 and 13, in step S12 illustrated in FIG. 7, the change possibility time calculation unit 212 calculates the first time at which there is a possibility that the variable axm.ADDR is changed in accordance with the reference signal axm.CLK. In addition, the change possibility time calculation unit 212 calculates the first time at which there is a possibility that the variable axm.DATA is changed.

Further, the change possibility time calculation unit 212 calculates the first time at which there is a possibility that the variable axm.READY is changed.

That is, when the remainder when dividing the counter value of the reference signal axm.CLK by 100 is 1, there is a possibility that the variable axm.ADDR is changed. In addition, when the remainder when dividing the counter value of the reference signal axm.CLK by 100 is 2, there is a possibility that the variable axm.DATA is changed.

Further, when the remainder when dividing the counter value of the reference signal axm.CLK by 100 is 1, there is a possibility that the variable axm.READY is changed.

In step S13, the reference possibility time calculation unit 213 calculates the second time at which there is a possibility that the variable axm.READY is checked in accordance with the reference signal axm.CLK.

That is, when the remainder when dividing the counter value of the reference signal axm.CLK by 100 is 1, there is a possibility that a value of the variable axm.READY will be checked/referenced.

When the remainder when dividing the counter value of the reference signal by 100 is 1, there is a possibility that the first signals are changed and the second signals are referenced. Thus, in step S18, it is determined that a signal contention state may be caused by the change of the reference signal.

Other configurations of the logic simulation verification system, the logic simulation verification method, and effects are substantially the same as those of the first embodiment illustrated in FIGS. 1 to 8.

Sixth Embodiment

The logic simulation verification system 1 according to a sixth embodiment will be described.

Figure 14:
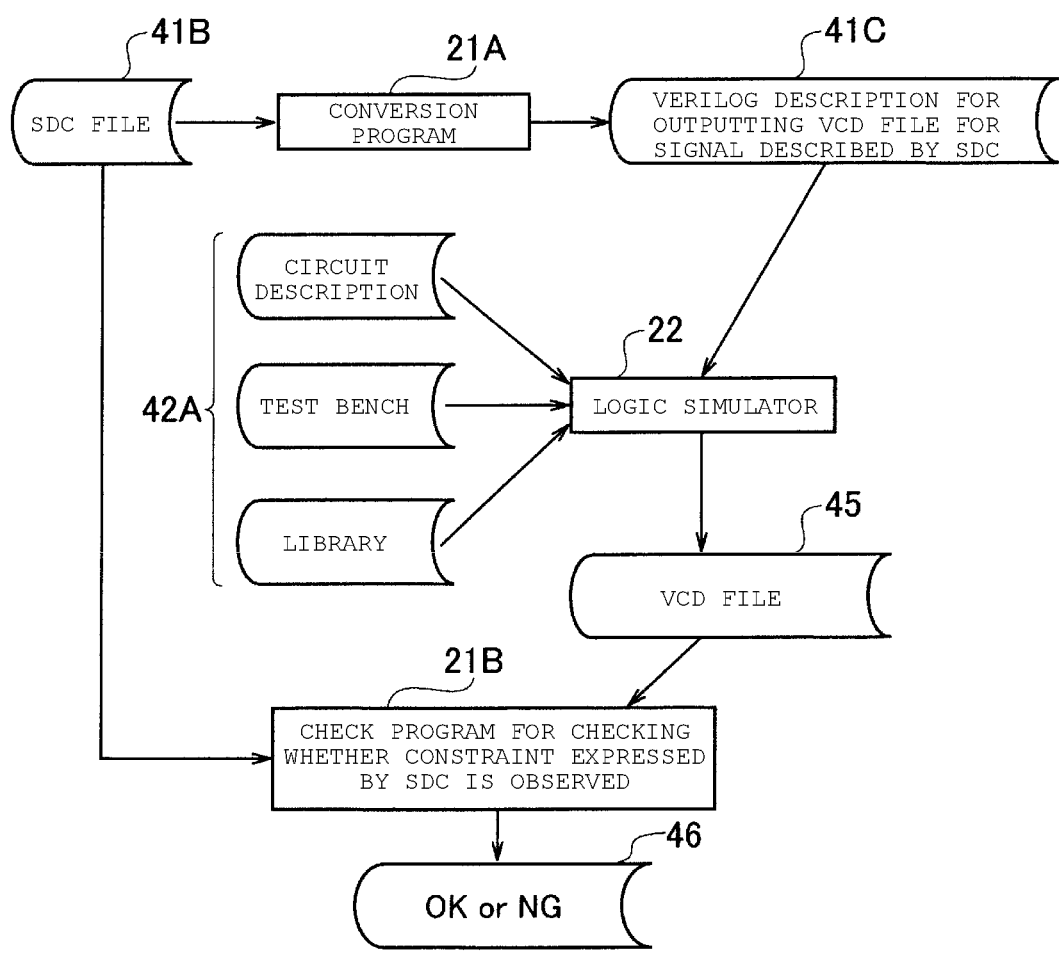
FIG. 14 is a block diagram depicting aspects related to verifying whether a constraint condition given by SDC is observed in a logic simulation.

FIG. 14 is a block diagram when the logic simulation verification system 1 according to the sixth embodiment verifies whether a constraint condition given by SDC is observed in a logic simulation.

As illustrated in FIG. 14, in the SDC file 41B, a timing constraint of the reference signal that is expressed by SDC may be given. The logic simulation verification unit 21 of the logic simulation verification system 1 according to the sixth embodiment may include a conversion program 21A that reads the SDC file 41B in which the timing constraint expressed by SDC is given and outputs a Verilog description for outputting a value change dump (VCD) file of the signal described by SDC.

The Verilog description for outputting a VCD file 45 for the signal described by SDC is indicated by 41C. The VCD file 45 is a file with a standard waveform format of Verilog-HDL. The VCD file is a text file in which changes in waveforms with language specifications are described.

The logic simulator 22 outputs the VCD file 45 for an execution by using the Verilog description 41C for outputting the VCD file for the signal of the SDC file and the input information data 42A including the library, the circuit description, and the test bench as the input information data.

The logic simulation verification unit 21 of the logic simulation verification system 1 according to the sixth embodiment may include a program 21B that checks whether the timing constraint expressed by SDC is observed by comparing the SDC file 41B, in which the timing constraint expressed by SDC is given, with the VCD file 45.

The program 21B that checks whether the timing constraint expressed by SDC is observed may output, as an output file 46, a comparison result indicating OK or NG.

Other configurations of the logic simulation verification system, the logic simulation verification method, and effects are substantially the same as those of the first embodiment illustrated in FIGS. 1 to 8.

In another embodiment, the circuit description of the circuit description file may be described in units of logic cones.

The above-described embodiments may be used not only with data described in Verilog-HDL format(s), but also or instead with data described in other hardware description languages.

The format of the timing constraints of the above-described embodiments is based on a SDC (Synopsys Design Constraint) format, but other formats for the timing constraints may be used instead.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A logic simulation verification system that verifies a change of a signal described in a library, a circuit description, and a test bench in accordance with a reference signal, the logic simulation verification system comprising:
   a change timing designation unit configured to designate a reference signal and a change timing for the reference signal;
   a change possibility time calculation unit configured to calculate a first time for which there is a possibility that a first signal to be assigned to a variable described in the library, the circuit description, and the test bench is changed in accordance with the change timing for the reference signal;
   a reference possibility time calculation unit configured to calculate a second time for which there is a possibility that a second signal assigned a variable described in the library, the circuit description, and the test bench is checked in accordance the change timing for the reference signal;
   a change possibility time determination unit configured to determine whether different circuits for which first signals are the same have first times that match; and
   a change/reference possibility time determination unit configured to determine whether a first time and a second time match with each other when a first signal of one circuit and a second signal of another circuit are the same.

2. The logic simulation verification system according to claim 1, wherein
   when the reference signals have different change periods, the change possibility time calculation unit is configured to:
      calculate a least common multiple of the change periods, and
      calculate the first times within a time period from an initial value of the reference signals to the least common multiple time, and
   the reference possibility time calculation unit is configured to calculate the second times within the time period from the initial value of the reference signals to the least common multiple.

3. The logic simulation verification system according to claim 1, wherein, when the reference signals are not repetitive, the change timing designation unit confirms a signal contention state in a power-on state by estimating a state in which the first signal and the second signal are changed at the same time in accordance with the reference signals.

4. The logic simulation verification system according to claim 1, wherein the change timing designation unit is configured to confirm whether the reference signal under a designated timing constraint condition is correct in a logic simulation based on the reference signal under the designated timing constraint condition.

5. A logic simulation verification method, comprising:
   designating a reference signal as a reference timing for a change of a signal based on information stored in a timing information storage unit included in a storage medium;
   calculating a first time at which there is a possibility that a first signal to be assigned to a variable described in a library, a circuit description, and a test bench is changed in accordance with the reference signal based on information stored in an input information data storage unit included in the storage medium;

calculating a second time at which there is a possibility that a second signal assigned a variable described in the library, the circuit description, and the test bench is checked in accordance with the reference signal based on the information stored in the input information data storage unit included in the storage medium;

determining whether different circuits for which first signals are the same have first times that match, and outputting a message to a message storage unit; and determining whether a first time and a second time match with each other when a first signal of one circuit and a second signal of another circuit are the same, and outputting the message to the message storage unit.

6. The logic simulation verification method according to claim 5, further comprising:

calculating a least common multiple of change periods when the reference signals have different change periods;

calculating the first times within a time period from an initial value of the reference signals to the least common multiple time; and calculating the second times within the time period from the initial value of the reference signals to the least common multiple.

7. The logic simulation verification method according to claim 5, further comprising:

confirming a signal contention state in a power-on state by estimating a state in which the first signal and the second signal are changed at the same time in accordance with the reference signals when the reference signals are not repetitive.

8. The logic simulation verification method according to claim 5, further comprising:

confirming whether the reference signal under a designated timing constraint condition is correct in a logic simulation based on the reference signal under the designated timing constraint condition.

9. A non-transitory computer readable storage medium storing program instructions that when executed by a computer in a logic simulation verification system causes the computer to perform a method comprising:

designating a reference signal as a reference timing for a change of a signal based on information stored in a timing information storage unit included in a storage medium;

calculating a first time at which there is a possibility that a first signal to be assigned to a variable described in a library, a circuit description, and a test bench is changed in accordance with the reference signal based on information stored in an input information data storage unit included in the storage medium;

calculating a second time at which there is a possibility that a second signal assigned a variable described in the library, the circuit description, and the test bench is checked in accordance with the reference signal based on the information stored in the input information data storage unit included in the storage medium;

determining whether different circuits for which first signals are the same have first times that match, and outputting a message to a message storage unit; and determining whether a first time and a second time match with each other when a first signal of one circuit and a second signal of another circuit are the same, and outputting the message to the message storage unit.

10. The non-transitory computer readable storage medium according to claim 9, the method further comprising:

calculating a least common multiple of change periods when the reference signals have different change periods;

calculating the first times within a time period from an initial value of the reference signals to the least common multiple time; and calculating the second times within the time period from the initial value of the reference signals to the least common multiple.

11. The non-transitory computer readable storage medium according to claim 9, the method further comprising:

confirming a signal contention state in a power-on state by estimating a state in which the first signal and the second signal are changed at the same time in accordance with the reference signals when the reference signals are not repetitive.

12. The non-transitory computer readable storage medium according to claim 9, the method further comprising:

confirming whether the reference signal under a designated timing constraint condition is correct in a logic simulation based on the reference signal under the designated timing constraint condition.

* * * * *